(12) United States Patent
Søgaard et al.

(10) Patent No.: US 12,542,451 B2
(45) Date of Patent: Feb. 3, 2026

(54) CONTROLLABLE POWER BACKUP SYSTEM FOR WIND TURBINE

(71) Applicant: VESTAS WIND SYSTEMS A/S, Aarhus N (DK)

(72) Inventors: Morten Bagger Søgaard, Thisted (DK); Niels Erik Danielsen, Brabrand (DK); Alun Jones, Hørning (DK); Carsten Lindgaard Jensen, Silkeborg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 692 days.

(21) Appl. No.: 17/611,850

(22) PCT Filed: May 15, 2020

(86) PCT No.: PCT/DK2020/050139
§ 371 (c)(1),
(2) Date: Nov. 16, 2021

(87) PCT Pub. No.: WO2020/228919
PCT Pub. Date: Nov. 19, 2020

(65) Prior Publication Data
US 2022/0224146 A1    Jul. 14, 2022

(30) Foreign Application Priority Data

May 16, 2019 (DK) .......................... PA 2019 70314

(51) Int. Cl.
*H02J 9/06* (2006.01)
*H02J 7/00* (2006.01)

(52) U.S. Cl.
CPC ............ *H02J 9/061* (2013.01); *H02J 7/0068* (2013.01)

(58) Field of Classification Search
CPC . H02J 9/061; H02J 7/0068; F05B 2270/1074; F03D 7/0284
See application file for complete search history.

(56) References Cited

U.S. PATENT DOCUMENTS

2011/0089763 A1    4/2011  Svensson et al.
2011/0291416 A1*  12/2011  Edenfeld ................. F03D 9/257
                                                              290/44

(Continued)

FOREIGN PATENT DOCUMENTS

CN    101091305 A    12/2007
CN    107005057 A     8/2017

(Continued)

OTHER PUBLICATIONS

Danish Patent and Trademark Office, 1st Technical Examination including The Search Report and Search Opinion for Application PA 2019 70314 dated Oct. 30, 2019.

(Continued)

*Primary Examiner* — Lincoln D Donovan
*Assistant Examiner* — Alex W Lam
(74) *Attorney, Agent, or Firm* — Patterson + Sheridan, LLP; Gero G. McClellan

(57) ABSTRACT

The present invention relates to a wind turbine comprising an internal power supply grid for distributing power to a number of power consuming units of the wind turbine, the wind turbine further comprising a power backup system connected to the internal power supply grid for supplying power to said internal power supply grid during a grid fault, wherein the power backup system comprises a controllable power storage module providing a total backup voltage that falls within a nominal voltage range of the internal power supply grid of the wind turbine. The present invention also relates to a power backup system and an associated method.

20 Claims, 4 Drawing Sheets

(56) References Cited

U.S. PATENT DOCUMENTS

| | | |
|---|---|---|
| 2015/0108755 A1 | 4/2015 | Das et al. |
| 2017/0133879 A1 | 5/2017 | Eckhardt et al. |
| 2018/0195495 A1 | 7/2018 | Williams |
| 2019/0103750 A1 | 4/2019 | Kristensen |
| 2019/0115631 A1 | 4/2019 | Taylor, Jr. et al. |
| 2021/0215137 A1* | 7/2021 | Damgaard .............. F03D 7/044 |

FOREIGN PATENT DOCUMENTS

| | | |
|---|---|---|
| EP | 2996219 A1 | 3/2016 |
| WO | 2005017350 A1 | 2/2005 |
| WO | 2009008863 A1 | 1/2009 |
| WO | 2014145756 A1 | 9/2014 |
| WO | 2018/224110 A1 | 12/2018 |
| WO | 2020228919 A1 | 11/2020 |

OTHER PUBLICATIONS

PCT, International Search Report and Written Opinion of The International Searching Authority for Application PCT/DK2020/050139 dated Aug. 5, 2020.

Chinese Patent Office, First Office Action for Chinese Patent Application No. 202080050530.0, dated Feb. 1, 2024.

Decision of Rejection received for Chinese Patent Application No. 202080050530.0, mailed on Jan. 1, 2025, 9 pages (5 pages of English Translation and 4 pages of Original Document).

Chinese Patent Office, Second Office Action for Chinese Patent Application No. 202080050530.0, dated Sep. 26, 2024.

Third Office Action and Search Report received for Chinese Patent Application No. 202080050530.0, mailed on Jul. 1, 2025, 18 pages (11 pages of English Translation and 7 pages of Original Document).

Office Action received for Chinese Patent Application No. 202080050530.0, mailed on Oct. 12, 2025, 13 pages (8 pages of English Translation and 5 pages of Original Document only).

* cited by examiner

CONTROLLABLE POWER BACKUP SYSTEM FOR WIND TURBINE

FIELD OF THE INVENTION

The present invention relates to a wind turbine comprising a power backup system for supplying power to an internal power supply grid of the wind turbine during a grid fault. In particular, the present invention relates to a power backup system providing a controllable total backup voltage that matches a nominal voltage range of the internal power supply grid of the wind turbine.

BACKGROUND OF THE INVENTION

A wind power plant, also referred to as a wind park, typically includes a plurality of wind turbines, the generating outputs of which are networked to supply power to the national or regional utility grid. A modern wind turbine includes complicated electrical systems including numerous control units, switching equipment, cooling systems, lighting systems, actuators and hydraulic systems which require their own dedicated power supply. This power supply is fed from the utility grid typically via a transformer substation. Such a power supply may be termed an 'internal power supply grid', and its role is to manage and distribute a medium voltage power supply to the wind turbines and auxiliary equipment in the form of power consuming units within the wind power plant to ensure high availability of power generation.

In the event of a so-called grid loss where the wind turbine loses connectivity to the utility grid, the electrical systems of the wind turbines also lose their supply of power. In order to mitigate problems arising from such power loss, it is known to equip the wind power plant with a form of auxiliary power supply. This may take the form of a battery-based system or may be based on a diesel generator. For example, WO 2018/224110 A1 describes a system in which a rechargeable battery is used as a power backup system.

A power backup system may ensure that at some vital electrical systems of the wind turbines of the wind power plant remain operational even during a utility grid loss. It is known to operate a wind turbine where a rechargeable battery is charged during grid loss from a DC link of the main converter bridging the generator and the utility grid. However, this arrangement requires that the main converter is operated during the grid loss which inevitably will induce undesired losses in the form of switching losses.

Moreover, conventional internal power supply grids of wind turbines are typically configured to be operated at a plurality of voltage levels which indeed increases the complexity as wells as the installations costs of such internal power supply grids as well as the costs of associated power backup systems.

SUMMARY OF THE INVENTION

It may be seen as an object of embodiments of the present invention to provide a wind turbine power backup system being capable of providing a controllable and essentially instant power backup to a wind turbine in case of an undesired grid fault, such as a grid loss or a low voltage ride through (LVRT).

The above-mentioned object is complied with by providing, in a first aspect, a wind turbine comprising an internal power supply grid for distributing power to a number of power consuming units of the wind turbine, the wind turbine further comprising a power backup system connected to the internal power supply grid for supplying power to said internal power supply grid during a grid fault, wherein the power backup system comprises a controllable power storage module providing a total backup voltage that falls within a nominal voltage range of the internal power supply grid of the wind turbine.

In the present context a grid fault may be grid loss where the connection to the utility grid is lost, or it may be a LVRT where the connection to the utility grid is maintained although the grid voltage has dropped significantly.

As it will be discussed in further details below the following advantages are associated with the power backup system of the present invention as well as with a wind turbine comprising the power backup system:

1) The internal power supply grid of the wind turbine to which the power backup system is directly connected comprises only a DC bus being configured to operate at a relatively high voltage level which reduces voltage drops, motor drives as wells as motor and cable dimensions.
2) The single DC bus is configured to distribute power to the various power consuming units of the entire wind turbine. In terms of implementation the single DC bus of the wind turbine is very simple thus reducing the complexity of hardware/software installations within the wind turbine as well as reducing the installation costs.
3) The power backup system of the present invention allows handling of significant higher power levels (both nominal and peak) as no DC/DC/AC boosters are incorporated.
4) By operating the single bus as a DC bus, and applying variable frequency drive AC motors, the need for AC-DC-AC inverters is eliminated. With no such AC-DC-AC inverters installed, inverting losses are significantly reduced, and as a consequence, the efficiency and backup time of the power backup system is increased.

The power storage module may comprise a first string of series connected controllable power storage units. The power storage module may further comprise a second string of series connected controllable power storage units, which like the first string of series connected storage units provides a total backup voltage that falls within the nominal voltage range of the internal power supply grid of the wind turbine. The power storage module may further comprise additional strings of series connected controllable power storage units. It is advantageous to apply a plurality of strings of series connected controllable power storage units in that the reliability of the power backup system is increased via redundancy where one string of series connected controllable power storage units may take over from another string of series connected controllable power storage units in case of failure.

In order to provide a redundant power backup system the first and second strings of series connected controllable power storage units may be connected in parallel.

Each controllable power storage unit may comprise a plurality of series connected power cells, a plurality of controllable switches, and a unit controller for controlling the plurality of controllable switches and thereby control the terminal voltage of each power storage unit. The plurality of series connected power cells may, in combination with four controllable switches, such as four MOSFETs, form an H-bridge.

The controllable power storage module may be controlled by controlling terminal voltage of each of the power storage units, by by-passing a faulty controllable power storage unit, or by connecting a controllable power storage unit. The terminal voltage of each controllable power storage unit may be controlled within the range −60 V DC to +60 V DC, such as within the range −50 V DC to +50 V DC. Also, a faulty controllable power storage unit may be by-passed by short-circuiting the faulty controllable power storage unit, and another healthy controllable power storage unit within the same string may take over its function.

The power cells may be selected from the group consisting of: lead-acid batteries, lithium-ion batteries, nickel metal hydride batteries and fuel cells. The plurality of power cells of a given power storage unit may be identical power cells having identical terminal voltages. Moreover, the plurality of power cells may be rechargeable power cells.

The power backup system may further comprise a string controller for each string of series connected controllable power storage units, said string controller being adapted to connect the string of power storage units to the internal power supply grid during the grid fault, i.e. during the grid loss or the LVRT. The string controller may further be adapted to disconnect the string of power storage units from the internal power supply grid when the grid connection has been reestablished and/or when the string of series connected power storage units has been fully charged.

The string controller for each string of series connected controllable power storage units may further be adapted to control the power storage units of the string individually, such as by-passing a faulty controllable power storage unit if required. The string controller may further be adapted to control the controllable power storage units in accordance with predetermined rules, such as balancing the number of operating hours of the controllable power storage units of the string, and controlling charge levels of the controllable power storage units of the string. Balancing the operating hours of the controllable power storage units is advantageous in that it may reduce wear and thereby increase the life time of the controllable power storage units. The number of operating hours depends on a variety of parameters, including voltage/charge level, charging system output voltage, battery type, battery charging duty cycle etc.

The voltage/charge levels of the controllable power storage units of a given string may be around the same level meaning that the string controller balances the charging/discharging of the individual controllable power storage units within the string. Thus, if the terminal voltage of one or more controllable power storage units are considered to be too low, said one or more power storage units are immediately charged by pulse width modulation (PWM) in order to bring their respective terminal voltages up to a desired voltage level within a relatively short time period, such as within for example 100-200 ms. Balancing of the voltage/charge levels may also be desired between the plurality of strings.

The operating hours of the controllable power storage units may be considered balanced if their respective operating hours/charge level vary within a predetermined range, such as within a range of 1-10%. It is be noted that the predetermined range may be different from this specific range. Similarly, the voltage/charge levels of the controllable power storage units within a string may be considered balanced if their respective voltage/charge levels vary below 5%. This 5% voltage variation limit may also apply to voltage/charge level variations between strings.

As already addressed the string controller may further be adapted to deactivate a controllable power storage unit of the string in case that controllable power storage unit for some reason fails, and may activate a spare controllable power storage unit of the same string. In terms of deactivation a controllable power storage unit may in general be considered faulty in case an abnormal characteristic of the unit is detected by a monitoring system, such as a battery monitoring system (BMS). As an example, a controllable power storage unit may be considered faulty if its capacity is depleted or damaged due an increased internal resistance or if the controllable power storage unit has been exposed to elevated temperatures. Moreover, leaking power cells as well as short-circuited power cells may also cause a controllable power storage unit to be considered faulty. The BMS may monitor at least the terminal voltages and temperatures of the controllable power storage units. In terms of activating a spare controllable power storage unit of the same string a suitable activation procedure may be provided in order to ensure that the spare controllable power storage unit is fully operable before being electrical connected to other controllable power storage units of the same string. The activation procedure may involve that the terminal voltage of the spare controllable power storage unit is measured, and adjusted if required.

As already addressed the internal power supply grid of the wind turbine to which the power backup system may be directly connected comprises only a DC bus being configured to operate at a relatively high voltage level. More particularly, the nominal voltage range of the internal power supply grid of the wind turbine may be within the range 400-1000 V DC, such as within the range 400-600 V DC, such as within the range 400-450 V DC and/or 450-560 V DC, whereby voltage drops, motor drives as wells as motor and cable dimensions may be reduced.

As the power backup system of the present invention comprises a power storage module providing a total backup voltage that falls within a nominal voltage range of the internal power supply grid of the wind turbine, the power backup system may be adapted to supply power directly to the internal power supply grid of the wind turbine during the grid fault, i.e. during the grid loss or the LVRT. By "directly" is meant that the voltage level provided by a given string of series connected controllable power storage units is not modified so that the voltage level of the internal power supply grid is given by the voltage level of the power storage module. Thus, neither passive nor controllable voltage adjusting devices, such as for example voltage boosters, are inserted in the connection between the power storage module and the internal power supply grid.

The wind turbine according to the first aspect may further comprise a sensor arrangement for detecting a grid fault, i.e. detecting a grid loss or a LVRT. This sensor arrangement may be a voltage, current and/or power sensor adapted to detect one or more of these electrical parameters at a point of common coupling (PCC) or at a point of measurement (PoM). When a detected electrical parameter at the PCC or the PoM is below a given threshold level the power backup system of the present invention is activated.

The wind turbine may further comprise a power supply module for providing power to the power consuming units of the wind turbine and/or charging the power backup system during normal operating conditions, i.e. not during idling conditions. Thus, the power supply module may, during normal operating conditions where the wind turbine is connected to the grid, supply power to the power consuming units of the wind turbine, and optionally charge power backup system if this is needed. If the power backup system is already fully charged it may be disconnected from the internal power supply grid so that the power supply module only powers the power consuming units of the wind turbine.

The wind turbine may further comprise a wind turbine controller adapted to disconnect selected power consuming units from the internal power supply grid of the wind turbine during the grid fault, i.e. during the grid loss or the LVRT, in order to save energy/power. Such selected power consuming units may involve critical control mechanisms such as for example control systems, yawing, lubrication and pitching.

In a second aspect, the present invention relates to power backup system for a wind turbine comprising an internal power supply grid for distributing power to a number of power consuming units of the wind turbine, the power backup system being adapted to supply power to the internal power supply grid during a grid fault, wherein the power backup system comprises a controllable power storage module providing a total backup voltage that falls within a nominal voltage range of the internal power supply grid of the wind turbine.

As already discussed in relation to the first aspect of the present invention the nominal voltage range of the internal power supply grid of the wind turbine may be within the range 400-1000 V DC. The power storage module of the power backup system may thus provide a total backup voltage within this voltage range The power storage module of the power backup system may comprise a first string of series connected controllable power storage units. Moreover, a second string of series connected controllable power storage units may be provided. The first and second strings of series connected controllable power storage units may be connected in parallel thus forming a redundant system.

As mentioned in relation to the first aspect each controllable power storage unit may comprise a plurality of series connected power cells, a plurality of controllable switches, and a unit controller for controlling the plurality of controllable switches and thereby control the terminal voltage of each power storage unit. The plurality of series connected power cells may, in combination with four controllable switches, such as four MOSFETs, form an H-bridge. The terminal voltage of each controllable power storage unit may be controlled within the range −60 V DC to +60 V DC, such as within the range −50 V DC to +50 V DC.

The power backup system may further comprise a string controller for each string of series connected controllable power storage units, said string controller being adapted to connect/disconnect the string of power storage units to the internal power supply grid during the grid fault, i.e. during the grid loss or the LVRT. The string controller may further be adapted to control the power storage units of the string individually, such as controlling the controllable power storage units in accordance with predetermined rules, such as balancing the number of operating hours of the controllable power storage units of the string, and controlling voltage/charge levels of the controllable power storage units of the string. Moreover, the string controller may further be adapted to deactivate a controllable power storage unit of the string in case that power storage unit fails, and activate a spare controllable power storage unit of the string.

In a third aspect, the present invention relates to a method for operating a power backup system of a wind turbine, wherein the power backup system comprises a controllable power storage module comprising a string of series connected controllable power storage units, wherein the string of series connected controllable power storage units provides a total backup voltage that falls within a nominal voltage range of an internal power supply grid of the wind turbine, the method comprising the step of controlling the controllable power storage units of the string individually.

The method may further comprise the step of deactivating a controllable power storage unit in case that power storage unit fails. Deactivation may be established by by-passing or short-circuiting the faulty power storage unit. In order to maintain the original power backup capacity the method may further comprise the step of activating a spare controllable power storage unit of the string in order to replace the deactivated controllable power storage unit.

As mentioned in relation to the first and second aspects each controllable power storage unit may comprise a plurality of series connected power cells, a plurality of controllable switches, and a unit controller for controlling the plurality of controllable switches and thereby control the terminal voltage of each power storage unit. The plurality of series connected power cells may, in combination with four controllable switches, such as four MOSFETs, form an H-bridge. The terminal voltage of each controllable power storage unit may be controlled within the range −60 V DC to +60 V DC, such as within the range −50 V DC to +50 V DC. The power cells may be selected from the group consisting of: lead-acid batteries, lithium-ion batteries, nickel metal hydride batteries and fuel cells.

The H-bridge design of the controllable power storage units may also be advantageous in relation to overvoltage situations in that the H-bridge design may be used to prevent or at least reduce overvoltage situations—for example in situations where permanent magnet yaw motors are forced into rotation by the wind turbine rotor loads. Permanent magnet yaw motors generate a voltage that increases in a linear manner with the rotational speed of the yaw motor. This generated power and thus voltage may be reduced by charging the power cells of the controllable power storage units. This charging also assists the yaw motor in counteracting or reducing the yaw rotation and thus limits the voltage being fed back into the system. By absorbing the generated excess voltage in the power cells dedicated active dump loads may be omitted.

Moreover, grid induced overvoltages may be counteracted by increasing the overall voltage of a string to the level that matches the overvoltage by activating additional controllable power storage units as the overvoltage would otherwise potentially damage the power backup system.

The controllable power storage units of a given string may be controlled individually by a string controller. The method of the third aspect may control the controllable power storage units of a string in a manner so as to balance the number of operating hours of the controllable power storage units of the string and/or controlling voltage/charge levels of the controllable power storage units of the string. Balancing the operating hours of the controllable power storage units is advantageous in that it may reduce wear and thereby increase the life time of the controllable power storage units.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

The present invention will now be explained in further details with reference to the accompanying figures, wherein.

Figure 1:
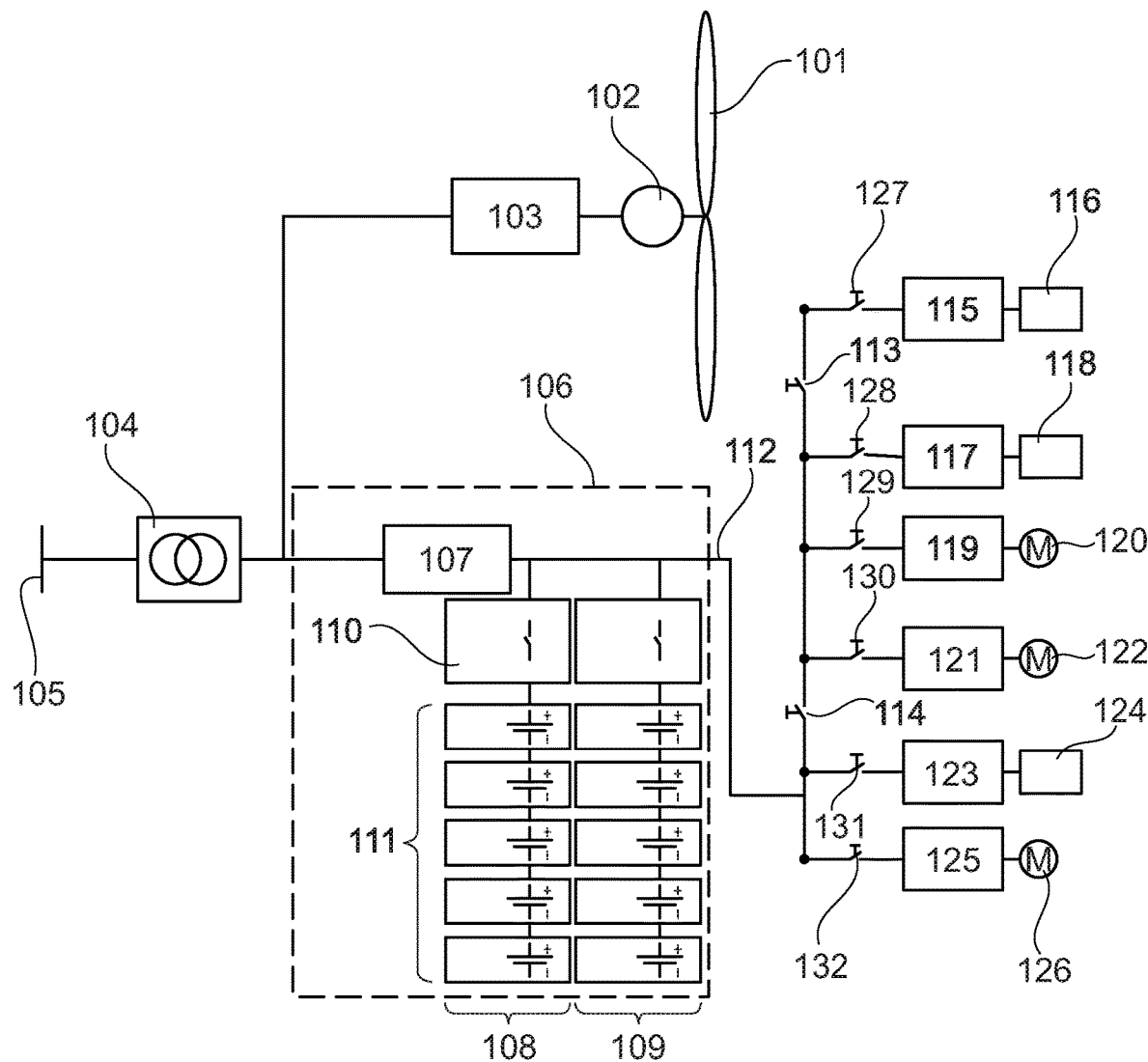
FIG. 1 shows a wind turbine comprising a power backup system according to the present invention.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF EMBODIMENTS

In a general aspect the present invention relates to a power backup system for supplying power to an internal power supply grid of a wind turbine during a grid fault, such as during a grid loss or a LVRT. The power backup system comprises a power storage module comprising one or more stacked, i.e. series connected, controllable power storage units providing a total backup voltage that falls within a nominal voltage range of the internal power supply grid of the wind turbine. As it will be discussed in further details below the terminal voltages of the power storage units may be controlled individually.

The total backup voltage refers to the output voltage of the power storage module, which in the embodiment of the series connected power storage units, is the aggregate output voltage of the connected power storage units, which for series connected power storage units is the sum of the individual output voltage of the power storage units. As the total backup voltage falls within the nominal voltage range of the internal power supply grid, the power backup system is directly connected to the internal power supply grid of the wind turbine. Thus, no voltage adjusting devices, such as voltage boosters and/or various inverter configurations, are required which is highly advantageous in that such devices introduce switching losses as well as connection delays in the event of a grid fault, i.e. a grid loss or a LVRT. The present invention also relates to a wind turbine comprising such a power backup system.

Referring now to FIG. 1 selected components of a wind turbine is depicted. As depicted in FIG. 1 a set of rotor blades 101 drives a generator 102 via an optional gear box (not shown) whereby wind energy may be converted to electrical energy. The power generated by the generator 102 is provided to a power converter 103 which may be a full-scale power converter. It should be noted that the generator may alternatively be a doubly-fed induction generator (DFIG) having a power converter connected to its rotor. Before reaching the utility grid 105 the power from the power converter 103 (for example 640-1000 V AC) is passed through a high-voltage transformer 104.

The wind turbine comprises an internal power supply grid 112 for supplying power to various power consuming units of the wind turbine. The internal power supply grid 112 forms a common DC bus within the wind turbine, said common DC bus being configured to be operated at a single and a relatively high voltage level in order to reduce installations costs, due to reduced cable dimensions, and reduce power losses. The power consuming units of the wind turbine may for example involve a wind turbine hub controller 116, a wind turbine nacelle controller 118 and a wind turbine tower controller 124 including respective power supply units 115, 117 and 123. Each power supply unit 115, 117, 123 is configured to provide an adjustable output voltage in the range 24-560 V DC. Moreover, respective circuit breakers 127, 128, 131 may disconnect and/or connect the power supply units 115, 117, 123 from the internal power supply grid 112. Also, various AC motors 120, 122, 126 including associated variable frequency drivers 119, 121, 125 and circuit breakers 129, 130, 132 are depicted in FIG. 1. The AC motors may be used for different purposes including yawing of the nacelle. Additional circuit breakers 113, 114 for electrically disconnecting and/or connecting the entire hub and/or the entire nacelle, respectively, are also depicted in FIG. 1.

The various circuit breakers 113, 114 and 127-132 are all controlled by a wind turbine controller adapted to connect and/or disconnect selected power consuming units from the internal power supply grid in response to various requirements, such as in order to save energy/power.

Still referring to FIG. 1 the power backup system is marked with the dashed line 106. The power backup system 106 comprises a first 108 and a second 109 power storage module each providing a total backup voltage that falls within a nominal voltage range of the internal power supply grid 112. Since the total backup voltage of the first 108 and second 109 power storage modules match the nominal voltage range of the internal power supply grid 112 the power backup system 106 may supply power directly to the internal power supply grid 112 without any voltage adjusting devices, such as voltage boosters and/or various inverter configurations. Typically, the nominal voltage range of the internal power supply grid 112 is within the range 400-1000 V DC.

Each of the two power storage modules 108, 109 comprises a string of series connected controllable power storage units 111. The implementation of the controllable power storage units 111 will be discussed in details in connection with FIGS. 2 and 3.

The number of controllable power storage units 111 in each string is in principle determined by the ratio between the nominal voltage range of the internal power supply grid 112 and the nominal terminal voltage of each of the controllable power storage units 111. For example, if the nominal terminal voltage of each of the controllable power storage units 111 is around 48-50 V DC a total of 10 or 11 power storage units 111 are required in order to match an internal power supply grid voltage of 450-560 V DC. Optionally, further controllable power storage units 111 may be included in one or both strings in order to have spare controllable power storage units at hand if required. For example, a faulty controllable power storage unit may be by-passed (short-circuited) and replaced by another controllable power storage unit within the same string. For illustrative and simplicity reasons each power storage module 108, 109 in FIG. 1 comprises a string of only five series connected controllable power storage units 111.

The two power storage modules 108, 109, and thereby the first and second strings of series connected controllable power storage units 111, are connected in parallel thereby providing a redundant power backup system where one power storage module may replace another power storage module in case of failure. It should be noted that further power storage modules each comprising a string of series connected controllable power storage units 111 may optionally be connected in parallel to the power storage modules 108, 109 depicted in FIG. 1.

Each of the controllable power storage units 111 comprises a plurality of series connected power cells which may be selected from the group consisting of: lead-acid batteries, lithium-ion batteries, nickel metal hydride batteries and fuel cells. In case the power cells are batteries these batteries are rechargeable batteries. As it will be discussed in detail in connection with FIGS. 2 and 3 each of the controllable power storage units 111 also comprises a plurality of controllable switched whereby the terminal voltage of each of the controllable power storage units 111 may be varied.

Each of the power storage modules 108, 109 depicted in FIG. 1 are operatively connected to the internal power supply grid 112 via a circuit breaker 110 the status of which is controlled by the wind turbine controller (not shown). During normal operating conditions, i.e. the wind turbine is connected to the utility grid 105, the power storage modules 108, 109 are charged by the power supply module 107 which also, during normal operating conditions, provides power to the various power consuming units of the wind turbine. An additional transformer (not shown) may be provided in front of the power supply module 107 so that the input voltage to the power supply module 107 becomes around 400 V AC. During charging of the power storage modules 108, 109 the circuit breakers 110 are closed. When the power storage modules 108, 109 are fully changed the circuit breakers 110 may optionally be opened. In case of a detected grid loss, i.e. the connection to the utility grid 105 is lost, or a LVRT at least one of the circuit breakers 110 is closed (if it is not already closed) so that power from at least one of the power storage modules 108, 109 may instantaneously be supplied to the internal power supply grid 112. A grid loss or a LVRT may be detected in various ways, such as a detected voltage, current or power change at the PCC or PoM.

In order to save power/energy it may be advantageous that only critical power consuming units of the wind turbine are powered during a grid fault, i.e. during a grid loss or a LVRT. Such critical power consuming units may for example comprise control systems, the pitching mechanism, the lubrication mechanism and the yawing mechanism. Typically, the wind turbine controller is responsible for deciding whether only critical power consumers are to be powered during a grid fault.

The capacity of the power backup system is sufficient to supply the necessary amount of power to at least the critical power consuming units of the wind turbine for at least a few minutes, a few hours or even up to a few days. In order to extend this period of time a separate charger for charging the power backup system while the wind turbine is idling during a grid fault, i.e. during a grid loss or a LVRT, is provided, cf. FIG. 4. Alternatively, the output power from the power converter 103 may be provided directly to the power storage modules 108, 109 during idling.

Figure 2:
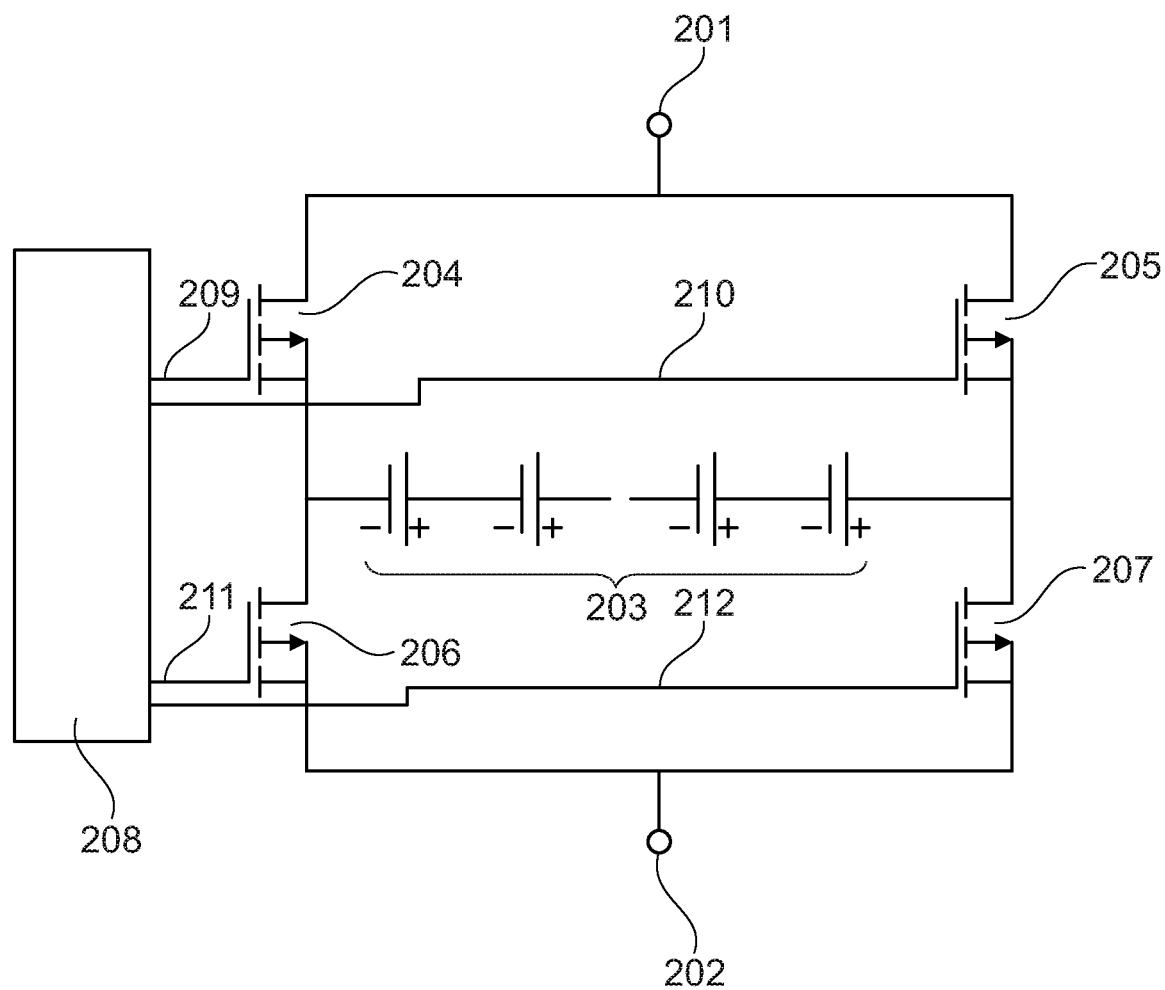
FIG. 2 shows a controllable power storage unit.
Figure 3:
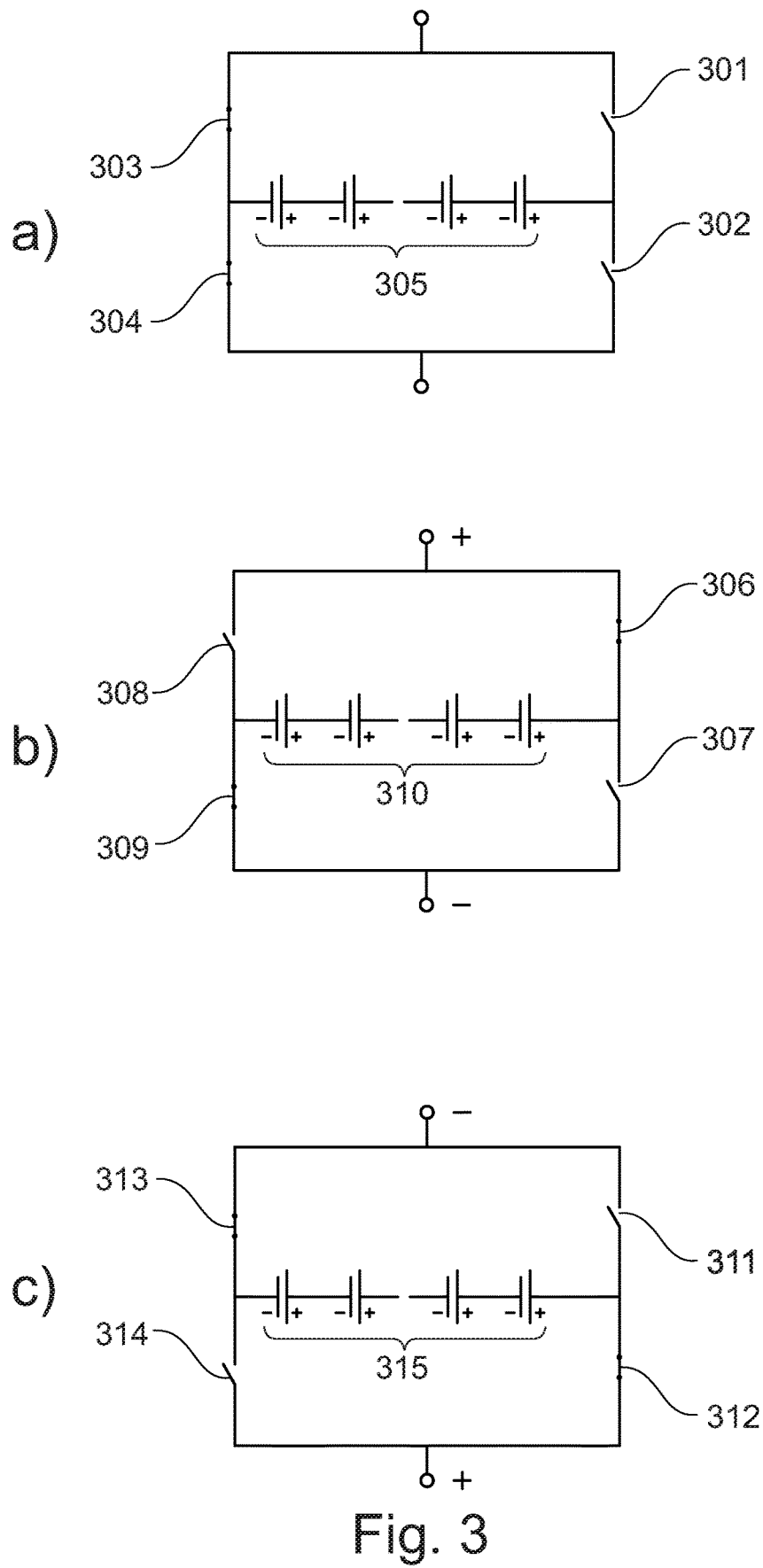
FIG. 3 shows three different states of a power storage unit.

Referring now to FIG. 2 a controllable power storage unit is depicted. As shown in FIG. 2 the controllable power storage unit comprises voltage terminals 201, 202, a plurality of series connected power cells 203, four controllable switches 204-207 in the form of MOSFETs, and a unit controller 208 for controlling the four MOSFETs 204-207 and thereby controlling the voltage between the voltage terminals 201, 202 of the controllable power storage unit. The controllable switches 204-207 may in principle be any kind of controllable switches, including MOSFETs as depicted in FIG. 2. The MOSFETS may be operated in various modes of operation, such as PWM, via control/gate signals provided via connections 209-212. As seen in FIG. 2 the plurality of series connected power cells form, in combination with four MOSFETs, an H-bridge. The voltage between the voltage terminals 201, 202 can be controlled by properly controlling the four MOSFETs. Typically, the terminal voltage of the controllable power storage unit is variable within range −60 V DC to +60 V DC, such as within the range −50 V DC to +50 V DC. The plurality of power cells 203 may in principle be any type of power cells, but they are typically selected from the group consisting of: lead-acid batteries, lithium-ion batteries, nickel metal hydride batteries and fuel cells. The plurality of power cells 203 may be identical power cells having identical terminal voltages. Moreover, the plurality of power cells 203 may be rechargeable batteries.

Turning now to FIG. 3a, a power storage unit in a by-passed mode of operation is depicted. As previously addressed it may be necessary to by-pass or short-circuit a given power storage unit in case the power storage unit is in somehow faulty, i.e. the power storage unit is not functioning as it is intended to do. As seen in FIG. 3a the power storage unit is by-passing by closing controllable switches 303, 304 whereby the voltage terminals of the power storage unit becomes short-circuited. The controllable switches 301, 302 remain open. Similar to FIG. 2 the controllable power storage unit depicted in FIG. 3a comprises a plurality of series connected power cells 305. In case a given power storage unit needs to be by-passed or short-circuited, another power storage unit, such as a spare power storage unit, within the same string of series connected power storage modules may replace it.

FIG. 3b also depicts a power storage unit comprising a plurality of series connected power cells 310 and a plurality of controllable switches 306-309. In FIG. 3b the controllable switches 306, 309 are closed, whereas the controllable switches 308, 307 remain open. With this configuration of the controllable switches 306-309 a positive voltage terminal (at the top) as well as a negative voltage terminal (at the bottom) are established. The voltage level between the voltage terminals is equal to the sum of voltages across the individual power cells 310.

In FIG. 3c a power storage unit also comprising a plurality of series connected power cells 315 and a plurality of controllable switches 311-314 is depicted. In FIG. 3c the controllable switches 312, 313 are closed, whereas the controllable switches 311, 314 remain open. With this configuration of the controllable switches 311-314 a positive voltage terminal (at the bottom) as well as a negative voltage terminal (at the top) are established, i.e. a polarity which is opposite to the polarity established in FIG. 3b. Similar to the configuration depicted in FIG. 3b the voltage level between the voltage terminals is equal to the sum of voltages across the individual power cells 315.

As already addressed a separate charger for charging the power backup system while the wind turbine is idling may be provided in order to extend the backup period of time.

Figure 4:
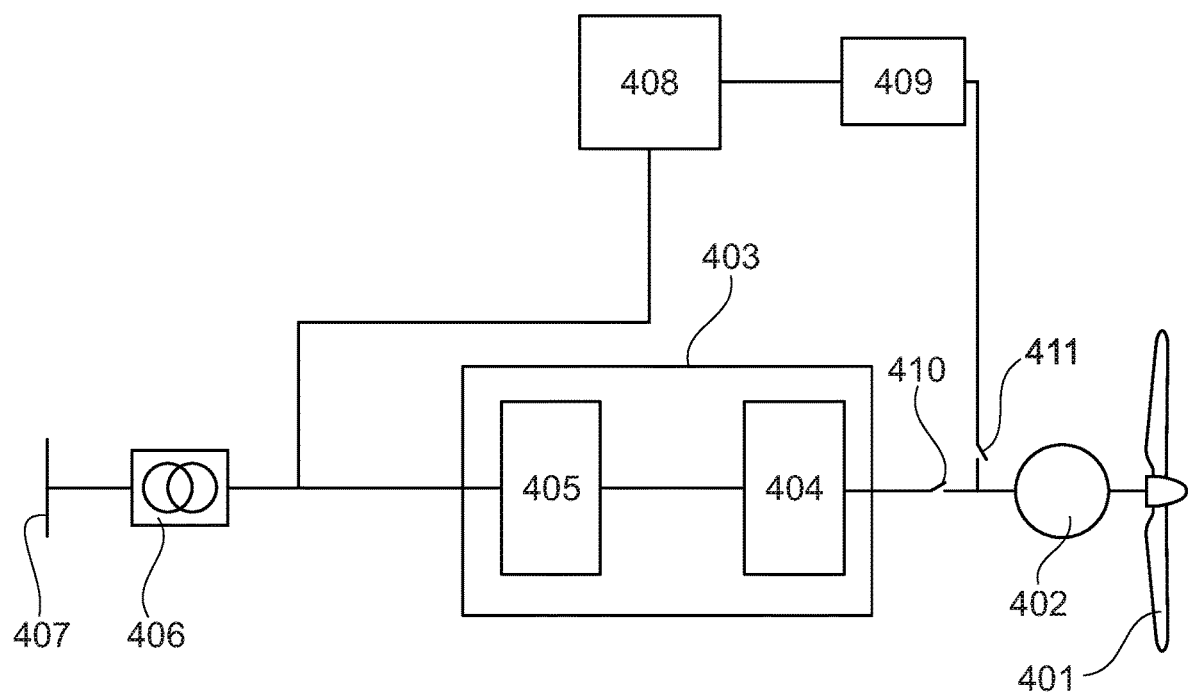
FIG. 4 shows a high-level block diagram of a wind turbine capable of charging the power backup system during an idling mode of operation.

Referring now to FIG. 4 selected components of a wind turbine are depicted again. As seen in FIG. 4 a set of rotor blades 401 drives a generator 402 via an optional gear box (not shown). The power generated by the generator 402 is provided to a power converter 403 which is depicted as a full-scale power converter comprising a generator-side inverter 404 and a grid-side inverter 405. It should be noted that the generator may alternatively be a doubly-fed induction generator (DFIG) having a power converter connected to its rotor. Before being injected into the utility grid 407 the power from the power converter 403 is passed through a high-voltage transformer 406. An additional transformer (not shown) may be provided between the grid-side inverter 405 and the high-voltage transformer 406.

During normal operating conditions, i.e. no grid loss or LVRT, circuit breaker 410 is closed (and circuit breaker 411 is open) whereby power generated by the generator 402 may be provided to the utility grid 407. Moreover, the power backup system 408 (corresponding to reference numeral 106 in FIG. 1) is powered/charged with power from the full-scale power converter 403.

In case of a grid fault, i.e. a grid loss or a LVRT the power backup system 408 powers at least the critical power consuming units of the wind turbine for a certain period of time. In case the grid connection for some reason cannot be reestablished the wind turbine is brought into an idling mode of operation, and the circuit breaker 410 is opened. Since the wind turbine is still idling the generator 402 generates a small amount of power. By closing the circuit breaker 411 and inserting a converter 409 in the power path between the generator 402 and the power backup system 408, this small amount of power may be used to charge the power backup system 408 until the grid connection is reestablished.

The invention claimed is:

1. A wind turbine, comprising:
an internal power supply grid for distributing power to a number of power consuming units of the wind turbine; and
a power backup system connected to the internal power supply grid for supplying power to said internal power supply grid during a grid fault, wherein the power backup system comprises a controllable power storage module providing a total backup voltage that falls within a nominal voltage range of the internal power supply grid such that a voltage level of the total backup voltage from the controllable power storage module is unmodified when provided by the power backup system to the internal power supply grid.

2. The wind turbine according to claim 1, wherein the controllable power storage module comprises a first string of series connected controllable power storage units.

3. The wind turbine according to claim 2, wherein the controllable power storage module further comprises a second string of series connected controllable power storage units providing a total backup voltage that falls within the nominal voltage range of the internal power supply grid of the wind turbine.

4. The wind turbine according to claim 2, wherein each controllable power storage unit comprises a plurality of series connected power cells, a plurality of controllable switches, and a unit controller for controlling the plurality of controllable switches and thereby control a respective terminal voltage of each power storage unit.

5. The wind turbine according to claim 4, wherein the plurality of series connected power cells in combination with four controllable switches, such as four MOSFETs, form an H-bridge.

6. The wind turbine according to claim 2, wherein the power backup system further comprises a string controller for each string of series connected controllable power storage units, said string controller being adapted to control the power storage units of the string individually.

7. The wind turbine according to claim 6, wherein the string controller is adapted to control the controllable power storage units in accordance with predetermined rules, such as balancing the number of operating hours of the controllable power storage units of the string, and controlling voltage/charge levels of the controllable power storage units of the string.

8. The wind turbine according to claim 6, wherein the string controller is adapted to deactivate a controllable power storage unit of the string in case that power storage unit fails, and activate a spare controllable power storage unit of the string.

9. The wind turbine according to claim 1, wherein the power backup system is adapted to supply power directly to the internal power supply grid of the wind turbine during the grid fault.

10. The wind turbine according to claim 1, further comprising a power supply module for providing power to the power consuming units of the wind turbine and/or charging the power backup system during normal operating conditions.

11. A power backup system for a wind turbine, comprising:
an internal power supply grid for distributing power to a number of power consuming units of the wind turbine, the power backup system being connected to the internal power supply grid for supplying power to said internal power supply grid during a grid fault; and
a controllable power storage module providing a total backup voltage that falls within a nominal voltage range of the internal power supply grid such that a voltage level of the total backup voltage from the controllable power storage module is unmodified when provided by the power backup system to the internal power supply grid.

12. A method for operating a power backup system of a wind turbine, wherein the power backup system comprises a controllable power storage module comprising a string of series connected controllable power storage units, wherein the string of series connected controllable power storage units provides a total backup voltage that falls within a nominal voltage range of an internal power supply grid of the wind turbine, the method comprising:
individually controlling the controllable power storage units of the string such that a voltage level of the total backup voltage from the controllable power storage module is unmodified when provided by the power backup system to the internal power supply grid.

13. The method according to claim 12, further comprising deactivating a controllable power storage unit in case that power storage unit fails.

14. The method according to claim 13, further comprising activating a spare controllable power storage unit of the string in order to replace the deactivated controllable power storage unit.

15. The method according to claim 12, wherein each controllable power storage unit comprises a plurality of series connected power cells, a plurality of controllable switches, and a unit controller for controlling the plurality of controllable switches and thereby control a respective terminal voltage of each power storage unit.

16. The method according to claim 12, wherein the controllable power storage units of the string are controlled in a manner so as to balance a number of operating hours of the controllable power storage units of the string and/or controlling voltage/charge levels of the controllable power storage units of the string.

17. The wind turbine according to claim 1, wherein the controllable power storage module comprises:
a first string of series connected controllable power storage units; and a second string of series connected controllable power storage units providing a total backup voltage that falls within the nominal voltage range of the internal power supply grid of the wind turbine; wherein each controllable power storage unit comprises a plurality of series connected power cells, a plurality of controllable switches, and a unit controller for controlling the plurality of controllable switches and thereby controlling a respective terminal voltage of each power storage unit.

18. The power backup system according to claim 11, wherein the controllable power storage module comprises a first string of series connected controllable power storage units.

19. The power backup system according to claim 18, wherein the controllable power storage module further comprises a second string of series connected controllable power storage units providing a total backup voltage that falls within the nominal voltage range of the internal power supply grid of the wind turbine.

20. The power backup system according to claim 19, wherein each controllable power storage unit comprises a plurality of series connected power cells, a plurality of controllable switches, and a unit controller for controlling the plurality of controllable switches and thereby control a respective terminal voltage of each power storage unit.

* * * * *